United States Patent
Yoo

(10) Patent No.: US 9,055,099 B2
(45) Date of Patent: Jun. 9, 2015

(54) METHOD OF PREVENTING TCP-BASED DENIAL-OF-SERVICE ATTACKS ON MOBILE DEVICES

(75) Inventor: In Seon Yoo, Seongnam-si (KR)

(73) Assignee: Samsung SDS Co., Ltd., Seoul (KR)

( * ) Notice: Subject to any disclaimer, the term of this patent is extended or adjusted under 35 U.S.C. 154(b) by 547 days.

(21) Appl. No.: 12/672,408

(22) PCT Filed: Sep. 14, 2007

(86) PCT No.: PCT/KR2007/004440
§ 371 (c)(1),
(2), (4) Date: May 7, 2010

(87) PCT Pub. No.: WO2009/020255
PCT Pub. Date: Feb. 12, 2009

(65) Prior Publication Data
US 2010/0299753 A1    Nov. 25, 2010

(30) Foreign Application Priority Data
Aug. 8, 2007  (KR) .................... 10-2007-0079637

(51) Int. Cl.
G06F 11/00    (2006.01)
H04L 29/06    (2006.01)
H04W 12/12   (2009.01)

(52) U.S. Cl.
CPC .......... *H04L 63/1458* (2013.01); *H04W 12/12* (2013.01); *H04L 69/16* (2013.01)

(58) Field of Classification Search
CPC .............................. H04W 12/12; H04L 69/16
USPC ...................................... 726/23–25; 713/163
See application file for complete search history.

(56) References Cited

U.S. PATENT DOCUMENTS

| 6,925,060 B2 * | 8/2005 | Mangin .................... 370/237 |
| 6,950,947 B1 * | 9/2005 | Purtell et al. ................ 726/12 |
| 7,203,961 B1 * | 4/2007 | Dalal et al. .................. 726/22 |

(Continued)

FOREIGN PATENT DOCUMENTS

WO    2006082507 A1    8/2006

OTHER PUBLICATIONS

An analysis of TCP reset behaviour on the internet, Martin Arlitt et al, Jan. 2005, ACM SIGCOMM computer communications review, vol. 35, No. 1, pp. 37-44.*

(Continued)

*Primary Examiner* — Abu Sholeman
(74) *Attorney, Agent, or Firm* — The Webb Law Firm

(57) ABSTRACT

Provided is a method of preventing a Transmission Control Protocol (TCP)-based Denial of Service (DoS) attack on a mobile device. The method efficiently prevents a DoS attack on a mobile device, which wirelessly and constantly transmits TCP packets to the mobile device using a TCP protocol and thereby exhausts resources of a wireless network and also battery power of the mobile device depending on a battery. An attack conventionally made in a wired network by abusing TCP-based three-way handshaking is more severe in the wireless network of mobile devices. To prevent such an attack on a mobile device, the method capable of checking three-way handshaking and each transition operation makes the mobile device check whether or not a received TCP packet is valid. Therefore, it is possible to efficiently prevent a DoS attack from exhausting wireless resources and battery power of the mobile device.

12 Claims, 7 Drawing Sheets

(56) References Cited

U.S. PATENT DOCUMENTS

| | | | |
|---|---|---|---|
| 7,363,652 B2* | 4/2008 | Yang et al. | 726/11 |
| 7,403,543 B2* | 7/2008 | Lee et al. | 370/477 |
| 7,458,097 B2* | 11/2008 | Dalal et al. | 726/22 |
| 7,554,972 B2* | 6/2009 | Shibasaki | 370/352 |
| 7,554,992 B2* | 6/2009 | Kimura et al. | 370/400 |
| 7,716,472 B2* | 5/2010 | Boisjolie et al. | 713/162 |
| 8,064,345 B2* | 11/2011 | Griffoul | 370/236 |
| 2002/0065924 A1* | 5/2002 | Barrall et al. | 709/227 |
| 2003/0084321 A1 | 5/2003 | Tarquini et al. | |
| 2003/0095535 A1* | 5/2003 | Le et al. | 370/349 |
| 2003/0119454 A1* | 6/2003 | Hattori | 455/73 |
| 2004/0034773 A1* | 2/2004 | Balabine et al. | 713/168 |
| 2004/0120255 A1* | 6/2004 | Gross et al. | 370/235 |
| 2004/0152439 A1* | 8/2004 | Kimura et al. | 455/403 |
| 2004/0236802 A1* | 11/2004 | Baratakke et al. | 707/204 |
| 2004/0252671 A1* | 12/2004 | Lee et al. | 370/349 |
| 2004/0252692 A1* | 12/2004 | Shim et al. | 370/392 |
| 2005/0053023 A1* | 3/2005 | Rajkotia et al. | 370/312 |
| 2005/0060535 A1* | 3/2005 | Bartas | 713/154 |
| 2005/0070246 A1* | 3/2005 | Qazi et al. | 455/347 |
| 2005/0180419 A1* | 8/2005 | Park et al. | 370/389 |
| 2005/0216954 A1* | 9/2005 | Ramaiah et al. | 726/22 |
| 2005/0267965 A1* | 12/2005 | Heller | 709/224 |
| 2005/0286527 A1* | 12/2005 | Tieu et al. | 370/394 |
| 2006/0003801 A1* | 1/2006 | Hattori | 455/552.1 |
| 2006/0075119 A1* | 4/2006 | Hussain et al. | 709/227 |
| 2006/0123079 A1* | 6/2006 | Sturniolo et al. | 709/203 |
| 2006/0190720 A1* | 8/2006 | Ozaki et al. | 713/160 |
| 2006/0200849 A1* | 9/2006 | Sundarrajan et al. | 725/110 |
| 2006/0227811 A1* | 10/2006 | Hussain et al. | 370/503 |
| 2006/0229022 A1 | 10/2006 | Bu et al. | |
| 2006/0230129 A1 | 10/2006 | Swami et al. | |
| 2006/0230450 A1 | 10/2006 | Bu et al. | |
| 2007/0011319 A1* | 1/2007 | McClure et al. | 709/224 |
| 2007/0044150 A1* | 2/2007 | Dalal et al. | 726/22 |
| 2007/0047457 A1* | 3/2007 | Harijono et al. | 370/250 |
| 2007/0130255 A1* | 6/2007 | Wolovitz et al. | 709/204 |
| 2007/0162777 A1* | 7/2007 | Imao | 713/320 |
| 2007/0168468 A1* | 7/2007 | Stogel et al. | 709/219 |
| 2007/0192593 A1* | 8/2007 | Boisjolie et al. | 713/162 |
| 2007/0195800 A1* | 8/2007 | Yang et al. | 370/401 |
| 2007/0202835 A1* | 8/2007 | Son et al. | 455/343.1 |
| 2007/0245409 A1* | 10/2007 | Harris et al. | 726/5 |
| 2007/0291749 A1* | 12/2007 | Taki | 370/356 |
| 2008/0095138 A1* | 4/2008 | Wu et al. | 370/342 |
| 2008/0170501 A1* | 7/2008 | Patel et al. | 370/235 |
| 2008/0177829 A1* | 7/2008 | Banerjee et al. | 709/203 |
| 2008/0212484 A1* | 9/2008 | Kaminsky et al. | 370/248 |
| 2009/0238344 A1* | 9/2009 | Nagoya | 379/45 |
| 2009/0247115 A1* | 10/2009 | Nagoya | 455/404.1 |
| 2009/0279429 A1* | 11/2009 | Griffoul | 370/230 |
| 2010/0023626 A1* | 1/2010 | Hussain et al. | 709/227 |
| 2010/0135324 A1* | 6/2010 | Pope et al. | 370/474 |

OTHER PUBLICATIONS

Information Sciences Institute University of Southern California, "Transmission Control Protocol", Sep. 1981, 89 pages.

Bruschi, Danilo, et al., Disarming offense to facilitate defense, Proceedings of the New Security Paradigms Workshop (NSPW), Sep. 18-22, 2000, pp. 69-75 (XP000988603), Ballycotton, County Cork, Ireland.

Comer, Douglas E., Internetworking with TCP/IP, vol. I: Principles, Protocols, and Arthitecture, Fourth Edition, Jan. 1, 2001, pp. 209-251 (XP002310034), Chapter 13—TCP, Sections 13.23 and 13.26.

Schuba, Christoph, et al., Analysis of a Denial of Service Attack on TCP, Security and Privacy (1997), IEEE 1997, pp. 208-223, Los Alamitos, CA.

\* cited by examiner

METHOD OF PREVENTING TCP-BASED DENIAL-OF-SERVICE ATTACKS ON MOBILE DEVICES

TECHNICAL FIELD

The present invention relates to a method of preventing a Transmission Control Protocol (TCP)-based Denial of Service (DoS) attack on a mobile device, and more particularly, to a method of efficiently preventing a DoS attack on a mobile device, which wirelessly and constantly transmits TCP packets to the mobile device using a TCP protocol and thereby exhausts resources of a wireless network and battery power of the mobile device depending on a battery.

BACKGROUND ART

In general, as Internet service has been expanded from wired to wireless service, and the types and services of mobile devices have been diversified, users can access the Internet through a mobile device from virtually anywhere.

For this reason, it is expected that service attacks made in the wired network will be gradually expanded to the wireless network. In particular, the attacks may be more severe in the wireless network due to limited resources of the wired network.

FIG. 1 is an overall conceptual diagram for describing a general state transition operation, and illustrates an entire standard finite state machine used to better describe the TCP protocol for establishing and terminating a TCP connection. In FIG. 1, all states and transitions are illustrated for reliability.

First, the TCP connection states are defined below.

LISTEN: a state in which a daemon of a server is executed and waits for a connection request.

SYN_SENT: a state in which a local client application has requested a remote host for connection.

SYN_RCVD: a state in which a server has received a connection request from a remote client, has replied to the client, but has not yet received an acknowledgement message.

ESTABLISHED: a state in which a server and a client are connected with each other after three-way handshaking is completed.

FIN_WAIT_1, CLOSE_WAIT, FIN_WAIT_2: states in which a server requests a client to terminate a connection, receives a reply, and terminates the connection.

CLOSING: an uncommon state in which an acknowledgement message is lost during transfer.

TIME_WAIT: a state in which a socket is open for a while for a slow segment that might have been lost although a connection is terminated.

CLOSED: a state in which a connection is completely terminated.

According to the connection principle of TCP communication that establishes and terminates a TCP connection, as defined in an antecedent document, e.g., Transmission Control Protocol, RFC 793, Jon Postel, DARPA Internet Program Protocol Specification, September 1981, the three-way handshaking procedure must be performed to establish a TCP connection between a client and a server.

More specifically, connection request (synchronous SYN), connection request/acknowledgement (synchronous/acknowledge SYN/ACK), and acknowledgement (acknowledge ACK) packets must be transmitted and received so that a client performs TCP communication with a server.

Here, when the three-way handshaking procedure of connection request SYN, connection request/acknowledge SYN/ACK, and acknowledge ACK is successively performed, a TCP connection is established between the client and the server, which means that a TCP communication port of the server requested by the client is open for communication.

Such a conventional TCP state transition shows what state of a TCP stack the TCP state transition is in according to the flag of a packet. However, according to conventional TCP state transition, an incoming packet is not thoroughly verified, and thus abuse of such vulnerability frequently occurs.

In other words, an attack abusing the three-way handshaking procedure, e.g., a DoS attack such as SYN flooding, can be made through the Internet.

Meanwhile, the entire above-described TCP state transition may or may not be supported according to an operating system installed in a mobile device. In an initial three-way handshaking step, there is no checking process for performing the entire TCP state transition suggested by the TCP specification. Therefore, when a network connection is attempted by a SYN flooding attack frequently used as a TCP-based DoS attack upon a mobile device that is mostly in a dormant state to save energy, the mobile device switches to an awake state and consumes energy.

In addition, even though a packet transmitted to a mobile device is for no useful reason, it may constantly attempt a connection to the mobile device and awake the same. In this case, resources of a wireless line are occupied, and also battery power of the mobile device is wasted.

DISCLOSURE OF INVENTION

Technical Problem

The present invention is directed to a method of efficiently preventing a Denial of Service (DoS) attack on a mobile device, which wirelessly and constantly transmits Transmission Control Protocol (TCP) packets to the mobile device using a TCP protocol and thereby exhausts resources of a wireless network and also battery power of the mobile device depending on a battery.

Technical Solution

A first aspect of the present invention provides a method of preventing a Denial of Service (DoS) attack by checking flow of packets transmitted between a base station and a mobile device using a Transmission Control Protocol (TCP) protocol, the method comprising the steps of: when the base station transmits a connection request SYN packet for a TCP connection to the mobile device, and then the mobile device receives the transmitted connection request SYN packet, transmitting, at the mobile device, a connection request acknowledgement SYN/ACK_1 packet to the base station; when the transmitted connection request acknowledgement SYN/ACK_1 packet is received, transmitting, at the base station, an acknowledgement ACK_2 packet corresponding to the connection request acknowledgement SYN/ACK_1 packet to the mobile device; when the mobile device receives the transmitted acknowledgement ACK_2 packet, establishing the TCP connection; and when the TCP connection is established, and then the mobile device receives a packet, in which a reset RST or connection request SYN flag is set, transmitted from the base station, terminating the established TCP connection.

Here, when the TCP connection is established, and then the mobile device cannot receive any packet during a previously set timeout period, it may be determined that the base station has abnormally terminated the TCP connection, and the mobile device may safely terminate the TCP connection.

The timeout period may be set to 0.5 seconds.

A second aspect of the present invention provides a method of preventing a DoS attack by checking flow of packets transmitted between a base station and a mobile device using a TCP protocol, the method comprising the steps of: when the base station transmits a connection request SYN packet for a TCP connection to the mobile device, and then the mobile device receives the transmitted connection request SYN packet, transmitting, at the mobile device, a connection request acknowledgement SYN/ACK_1 packet to the base station; receiving, at the base station, the transmitted connection request acknowledgement SYN/ACK_1 packet and then transmitting a finish FIN packet to the mobile device; and when the mobile device receives the transmitted finish FIN packet, terminating the TCP connection.

A third aspect of the present invention provides a method of preventing a DoS attack by checking flow of packets transmitted between a base station and a mobile device using a TCP protocol, the method comprising the steps of: when the base station transmits a connection request SYN packet for a TCP connection to the mobile device, and then the mobile device receives the transmitted connection request SYN packet, transmitting, at the mobile device, a connection request acknowledgement SYN/ACK_1 packet to the base station; receiving, at the base station, the transmitted connection request acknowledgement SYN/ACK_1 packet and then transmitting an acknowledgement finish ACK_2/FIN packet, in which an acknowledgement ACK_2 flag corresponding to the connection request acknowledgement SYN/ACK_1 packet and a FIN flag are set, to the mobile device; and when the mobile device receives the transmitted acknowledgement finish ACK_2/FIN packet, terminating the TCP connection.

A fourth aspect of the present invention provides a method of preventing a DoS attack by checking flow of packets transmitted between a base station and a mobile device using a TCP protocol, the method comprising the steps of: when the base station transmits a connection request SYN packet for a TCP connection to the mobile device, and then the mobile device receives the transmitted connection request SYN packet, transmitting, at the mobile device, a connection request acknowledgement SYN/ACK_1 packet to the base station; receiving, at the base station, the transmitted connection request acknowledgement SYN/ACK_1 packet and then retransmitting the connection request SYN packet to the mobile device; and when the mobile device receives the retransmitted connection request SYN packet, terminating the TCP connection.

Here, when the mobile device cannot receive any packet during a previously set timeout period after transmitting the connection request acknowledgement SYN/ACK_1 packet to the base station, it may be determined that the base station has abnormally terminated the TCP connection, and the mobile device may safely terminate the TCP connection.

The timeout period may be set to 0.5 seconds.

A fifth aspect of the present invention provides a method of preventing a DoS attack by checking flow of packets transmitted between a base station and a mobile device using a TCP protocol, the method comprising the step of: safely terminating a TCP connection when, after the TCP connection is established between the base station and the mobile device, the mobile device transmits a finish/acknowledgement FIN/ACK packet for normally terminating the TCP connection to the base station and then cannot receive an acknowledgement ACK_3 packet from the base station during a previously set timeout period.

Here, the timeout period may be set to 0.5 seconds.

A sixth aspect of the present invention provides a recording medium storing a program for executing the above-described method of preventing a TCP-based DoS attack on a mobile device.

Advantageous Effects

According to the inventive method of preventing a Transmission Control Protocol (TCP)-based Denial of Service (DoS) attack on a mobile device, it is possible to prevent a DoS attack from wasting wireless resources and battery power of the mobile device. In addition, when a connection is attempted through a wireless network by a DoS attack, it is possible to safely protect the mobile device at an early stage.

MODE FOR THE INVENTION

Hereinafter, exemplary embodiments of the present invention will be described in detail. However, the present invention is not limited to the exemplary embodiments disclosed below and can be implemented in various modified forms. The present exemplary embodiments are provided to enable one of ordinary skill in the art to embody and practice the invention.

First, the present invention can be applied to any case in which a mobile device supplied with power from a battery wirelessly receives Transmission Control Protocol (TCP) packets and thereby receives service. The present invention is a protection means that can be applied to a mobile device, a smart phone, etc., using, for example, a Web Personal Digital Assistant (PDA), a second generation (2G)-Evolution-Data Optimized (EVDO) cellular network, a 3G/4G data service cellular network, etc., capable of receiving TCP service outside the field of sensor network for which a protocol has not yet determined.

In addition, the present invention is implemented in a mobile device and checks and processes resource-consuming TCP packets. Therefore, the present invention is a method of efficiently managing wireless resources and the mobile device's resources, and also can be used as a method of safely protecting the mobile device when a connection is attempted through a wireless network by a Denial of Service (DoS) attack.

Figure 1:
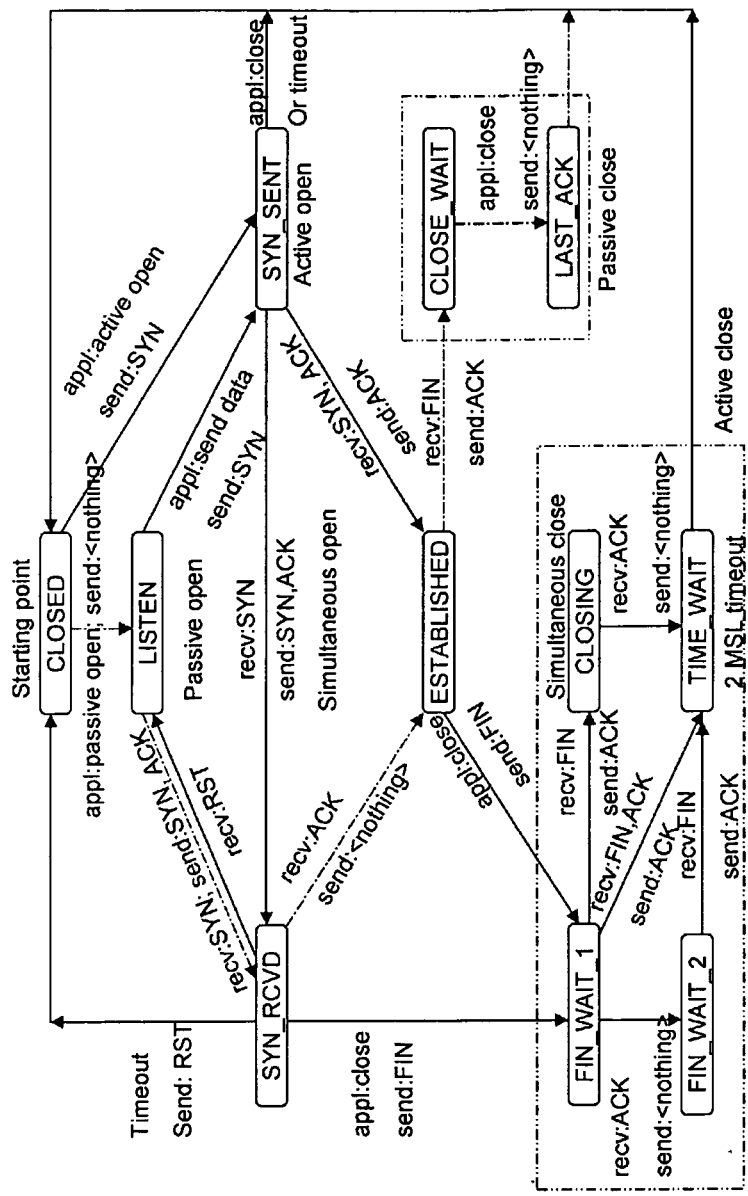
FIG. 1 is an overall conceptual diagram for describing a general state transition operation.
Figure 2:
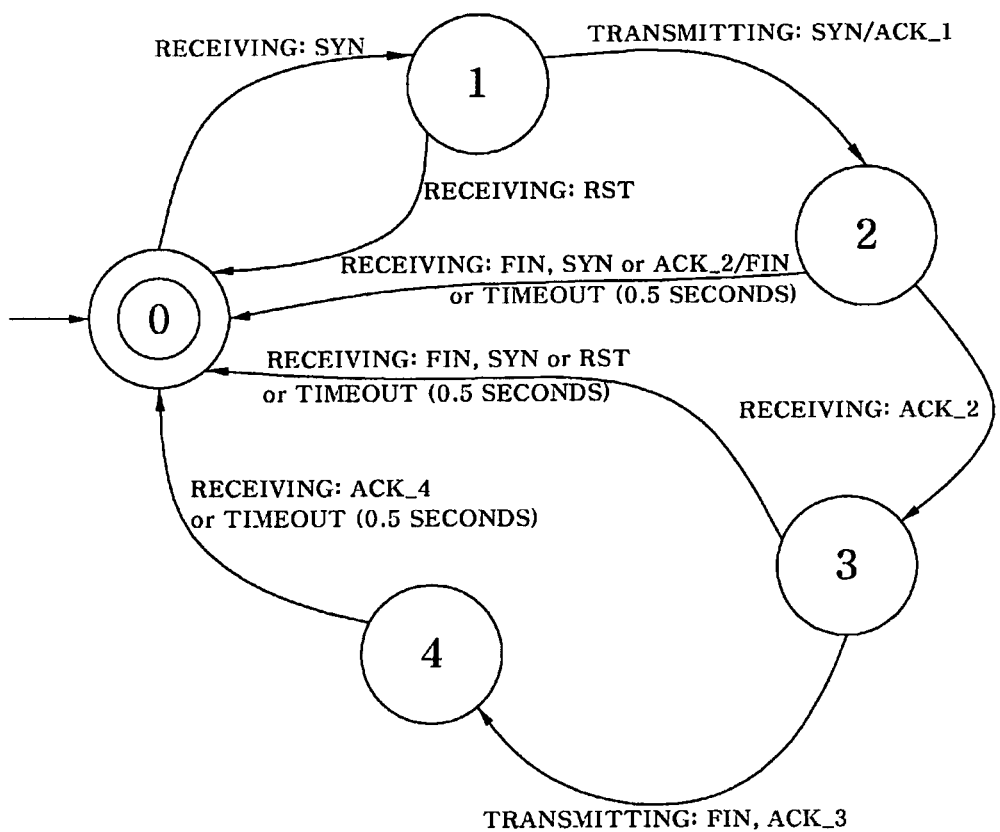
FIG. 2 is an overall conceptual diagram of a model for implementing a method of preventing a Transmission Control Protocol (TCP)-based Denial of Service (DoS) attack on a mobile device according to an exemplary embodiment of the present invention.

FIG. 2 is an overall conceptual diagram of a model for implementing a method of preventing a TCP-based DoS attack on a mobile device according to an exemplary embodiment of the present invention.

Referring to FIG. 2, the entire model for implementing a method of preventing a TCP-based DoS attack on a mobile device according to an exemplary embodiment of the present invention consists of 5 states 0 to 4, and the 5 states are connected in various forms according to the flow of packets transmitted/received between a base station and the mobile device, e.g., a cellular phone, a PDA, a WebPDA, another wireless mobile device capable of supporting TCP networking, and so on.

Meanwhile, the model applied to an exemplary embodiment of the present invention checks and determines whether or not a packet transmitted and received for TCP state transition conforms to a TCP specification while monitoring packets transmitted and received between the base station and the mobile device.

In other words, the present invention performs a conventional checking function according to TCP state transition. Therefore, in each step, it is possible to check what state will be next according to the flag of a transmitted and received packet, and what flag must be set in a received packet in a current state.

In addition, according to all packets input to the mobile device, one session goes through the first state 0 to the fifth state 4 and returns to the first state 0. Using the flags of packets constituting the session, it is possible to check the order of the steps 0 to 4 and whether a packet that should not be input is received. Here, the first state 0 indicates the start and end of one session.

Figure 3:
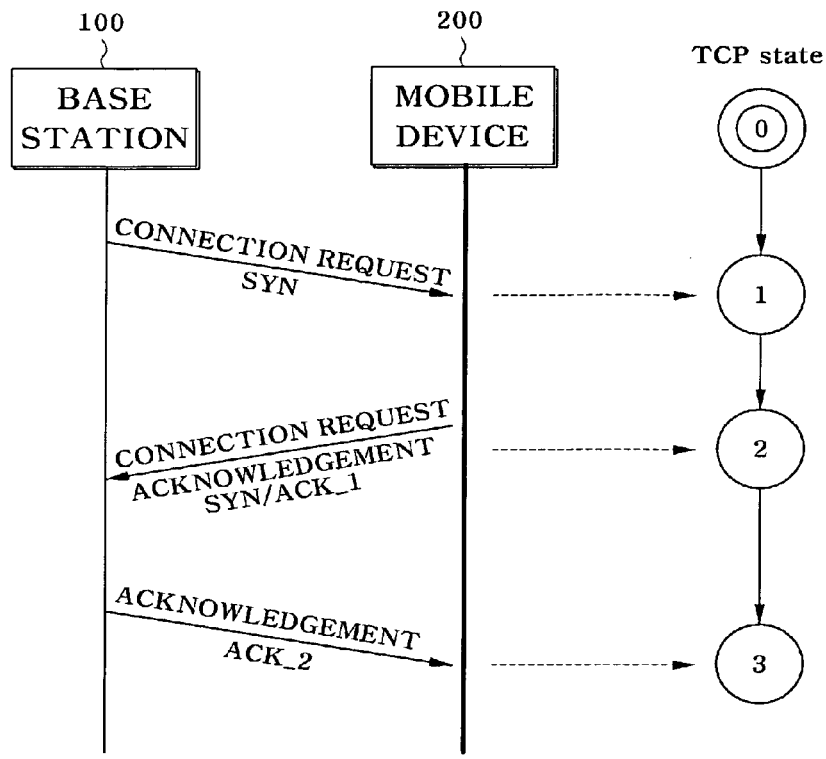
FIG. 3 illustrates the flow of packets and TCP state transition operations in a process of normally establishing a TCP connection between a base station and a mobile device.

FIG. 3 illustrates the flow of packets and TCP state transition operations in a process of normally establishing a TCP connection between a base station and a mobile device.

Referring to FIGS. 2 and 3, when a session is first established between a base station 100 and a mobile device 200, the TCP state of the mobile device 200 is set to the first state 0, which indicates the start and end of one session.

Subsequently, the base station 100 transmits a connection request SYN packet, in which a SYN flag is set, to a specific port of the mobile device 200 desired to connect thereto. When the mobile device 200 checks the reception of the connection request SYN packet transmitted from the base station 100 according to the present invention, the TCP state of the mobile device 200 changes from the first state 0 to the second state 1.

Then, the mobile device 200 transmits a connection request acknowledgement SYN/ACK_1 packet, in which a connection request SYN flag and an acknowledgement ACK_1 flag of the mobile device 200 are set, to the base station 100 in the way of accepting the connection request. When the mobile device 200 checks the transmission of the connection request acknowledgement SYN/ACK_1 packet to the base station 100 according to the present invention, the TCP state of the mobile device 200 changes from the second state 1 to the third state 2.

Subsequently, the base station 100 transmits an acknowledgement ACK_2 packet corresponding to the connection request acknowledgement SYN/ACK_1 packet to the mobile device 200. When the mobile device 200 checks the reception of the acknowledgement ACK_2 packet transmitted from the base station 100 according to the present invention, the TCP state of the mobile device 200 changes from the third state 2 to the fourth state 3, thereby establishing a TCP connection. After this, data transmission may be performed between the base station 100 and the mobile device 200.

When the TCP connection is initially attempted, a TCP packet received by the mobile device 200 must be the connection request SYN packet. Through three-way handshaking, the TCP connection with a node to which the TCP connection was attempted is established.

Therefore, in response to the connection request SYN packet, the mobile device 200 transmits the connection request acknowledgement SYN/ACK_1 packet and receives the acknowledgement ACK_2 packet as a reply to the connection request acknowledgement SYN/ACK_1 packet. When the process is completely performed, one TCP connection is established.

The present invention provides pointers to the steps of the first state 0 to the fourth state 3 so that the mobile device 200 can check each step for establishing a TCP connection one by one. Because a pointer exists in each step since the connection request SYN packet initially attempts the TCP connection until three-way handshaking is completed, it is possible to immediately catch a moment that the process is abnormally performed and also appropriately cope with the malfunction.

Figure 4:
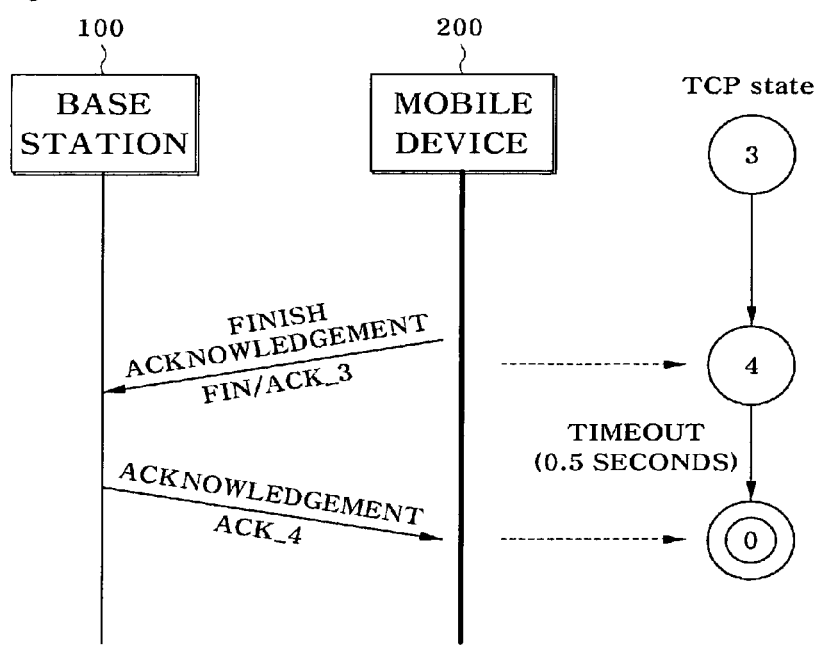
FIG. 4 illustrates the flow of packets and TCP state transition operations in a process of normally terminating a TCP connection between a base station and a mobile device.

FIG. 4 illustrates the flow of packets and TCP state transition operations in a process of normally terminating a TCP connection between a base station and a mobile device.

Referring to FIGS. 2 and 4, in the fourth state 3 in which a TCP connection is established between the base station 100 and the mobile device 200, the mobile device 200 transmits a finish acknowledgement FIN/ACK_3 packet, in which a FIN flag is set, to a specific port of the base station 100 in order to terminate the TCP connection with the base station 100. When the finish acknowledgement FIN/ACK_3 packet transmitted from the mobile device 200 is received, the base station 100 transmits an acknowledgement ACK_4 packet, corresponding to the finish acknowledgement FIN/ACK_3 packet, to the mobile device 200 to inform that termination of the TCP connection is recognized.

Here, when the mobile device 200 checks the transmission of the finish acknowledgement FIN/ACK_3 packet to the base station 100 according to the present invention, the TCP state of the mobile device 200 changes from the fourth state 3 to the fifth state 4.

Subsequently, the base station 100 transmits the acknowledgement ACK_4 packet corresponding to the finish acknowledgement FIN/ACK_3 packet. When the mobile device 200 checks the reception of the acknowledgement ACK_4 packet transmitted from the base station 100 according to the present invention, the TCP state of the mobile device 200 changes from the fifth state 4 to the first state 0, thereby terminating the TCP connection.

Meanwhile, when the base station 100 previously terminates the connection without transmitting the acknowledgement ACK_4 packet in the fifth state 4, a timeout is triggered, and the mobile device 200 also switches to the first state 0 in order to terminate the TCP connection.

In other words, when the mobile device 200 cannot receive the acknowledgement ACK_4 packet during a previously set timeout period, which may be about 0.5 seconds, the TCP state of the mobile device 200 changes from the fifth state 4 to the first state 0, thereby safely terminating the TCP connection.

A method of preventing a TCP-based DoS attack on a mobile device according to an exemplary embodiment of the present invention will be described in detail below with reference to several examples of an abnormal TCP connection.

In other words, it is described how the mobile device 200 can check and cope with a DoS attack using the model applied to the present invention when DoS attacks are made. Most DoS attacks that the mobile device 200 can cope with make an abnormal attempt to establish a TCP connection.

Figure 5:
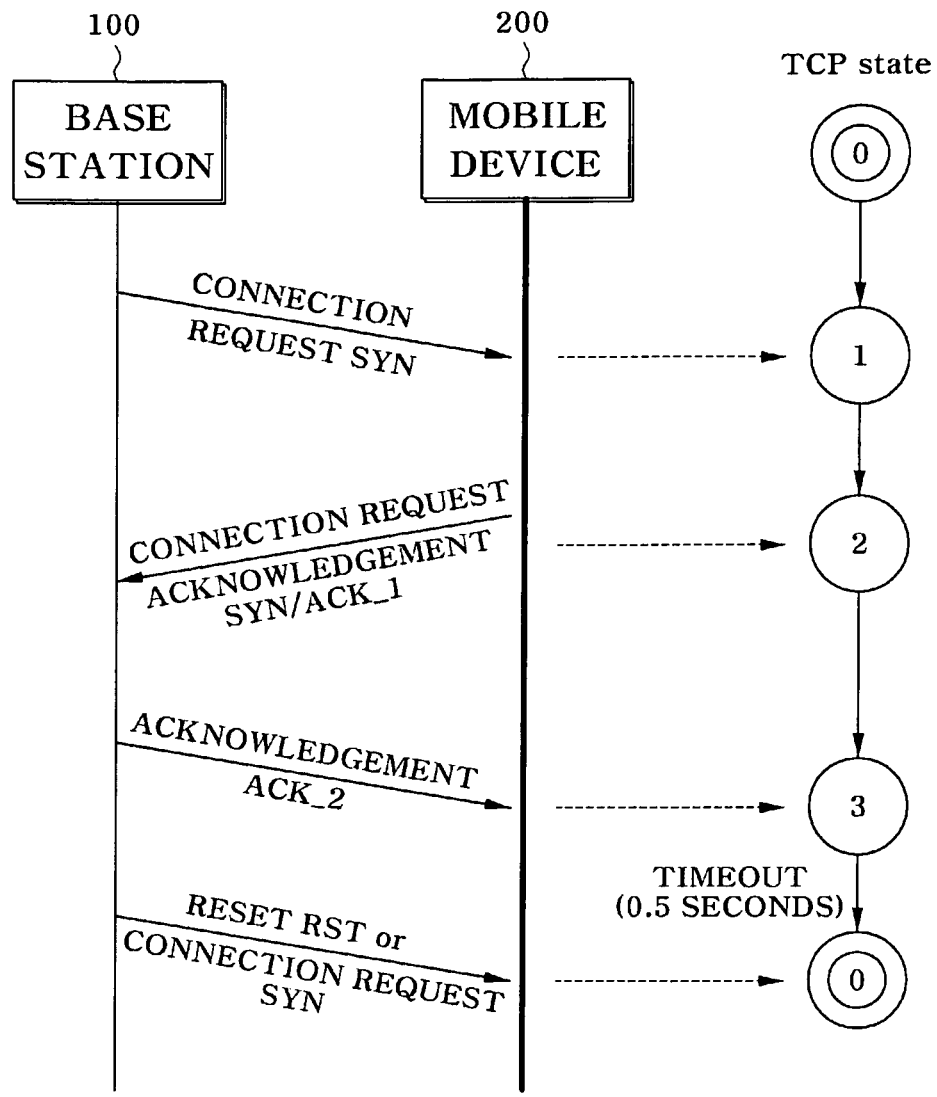
FIG. 5 illustrates the flow of packets and TCP state transition operations in a first example of an abnormal TCP connection.

FIG. 5 illustrates the flow of packets and TCP state transition operations in a first example of an abnormal TCP connection.

Referring to FIGS. 2 and 5, when the mobile device 200 checks the reception of a connection request SYN packet transmitted from the base station 100, the TCP state of the mobile device 200 changes from the first state 0 to the second state 1. And then, when the mobile device 200 checks the transmission of a connection request acknowledgement SYN/ACK_1 packet to the base station 100, the TCP state of the mobile device 200 changes from the second state 1 to the third state 2.

Subsequently, when the mobile device 200 checks the reception of an acknowledgement ACK_2 packet transmitted from the base station 100, the TCP state of the mobile device 200 changes from the third state 2 to the fourth state 3, thereby establishing a TCP connection.

After this, when the mobile device 200 checks the reception of a packet, in which a reset RST or connection request SYN flag is set, i.e., the connection request packet, transmitted from the base station 100, the TCP state of the mobile device 200 changes from the fourth state 3 directly to the first state 0, thereby safely terminating the TCP connection.

Meanwhile, when the base station 100 abnormally terminates the connection without transmitting any packet in the fourth state 3, a timeout is triggered according to the present invention, and the mobile device 200 directly switches to the first state 0 in order to terminate the TCP connection.

In other words, when the mobile device 200 cannot receive any packet during a previously set timeout period, which may be about 0.5 seconds, the TCP state of the mobile device 200 changes from the fourth state 3 directly to the first state 0, thereby safely terminating the TCP connection.

After considering all the descriptions in the first example of an abnormal TCP connection, a case frequently occurs in which the connection request SYN packet is constantly transmitted to the mobile device 200 in a wireless network. In this case, resources of the wireless network are wasted, and the mobile device 200 is kept in an awake state and consumes battery power.

Therefore, when a reset RST or connection request SYN packet is input after three-way handshaking, the packet is considered as an abnormal packet. Then, the mobile device 200 switches from the first state 0 to the fourth state 3 sequentially as described above and then switches back to the first state 0, thereby not receiving the packet.

Figure 6:
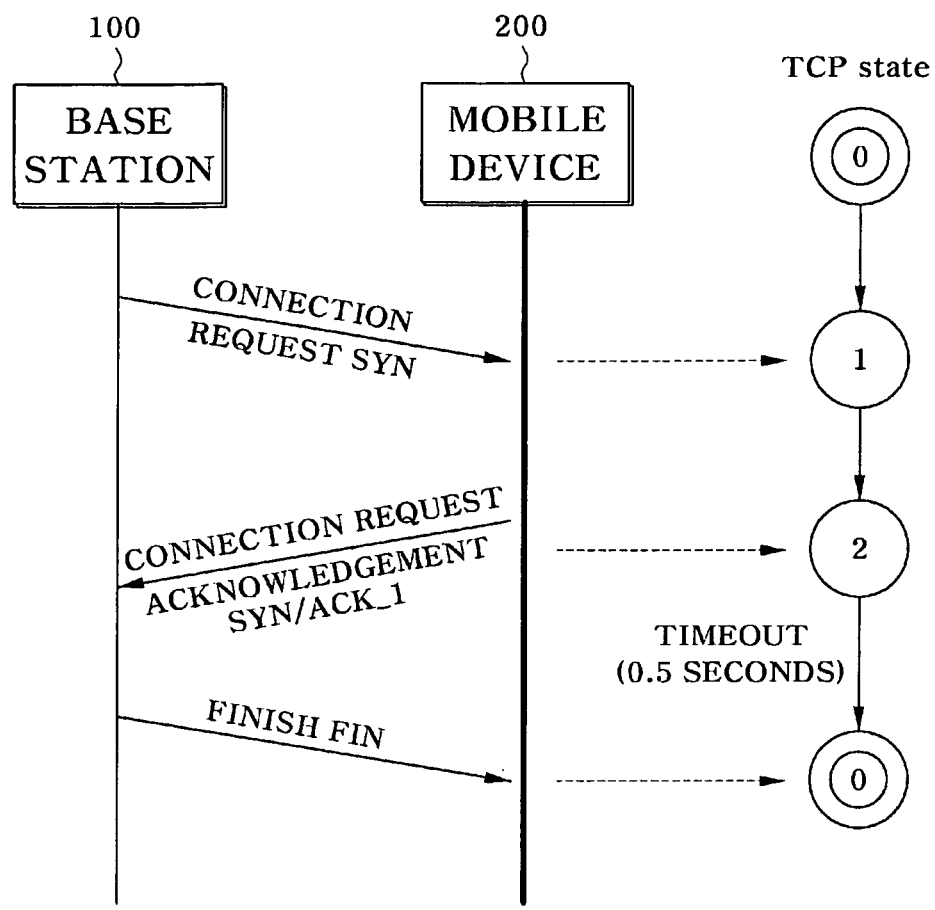
FIG. 6 illustrates the flow of packets and TCP state transition operations in a second example of an abnormal TCP connection.

FIG. 6 illustrates the flow of packets and TCP state transition operations in a second example of an abnormal TCP connection.

Referring to FIGS. 2 and 6, when the mobile device 200 checks the reception of a connection request SYN packet transmitted from the base station 100, the TCP state of the mobile device 200 changes from the first state 0 to the second state 1. And then, when the mobile device 200 checks the transmission of a connection request acknowledgement SYN/ACK_1 packet to the base station 100, the TCP state of the mobile device 200 changes from the second state 1 to the third state 2.

Subsequently, when the mobile device 200 receives a finish FIN packet transmitted from the base station 100, it is determined that the base station 100 has abnormally terminated the connection, and the TCP state of the mobile device 200 changes from the third state 2 directly to the first state 0, thereby safely terminating the TCP connection.

Meanwhile, when the base station 100 abnormally terminates the connection without transmitting any packet in the third state 2, a timeout is triggered, and the mobile device 200 also switches directly to the first state 0 in order to terminate the TCP connection.

In other words, when the mobile device 200 cannot receive any packet during a previously set timeout period, which may be about 0.5 seconds, the TCP state of the mobile device 200 changes from the third state 2 directly to the first state 0, thereby safely terminating the TCP connection.

After considering all the descriptions in the second example of an abnormal TCP connection, a case occurs in which the finish FIN packet is unexpectedly received during the three-way handshaking procedure. In other words, an operating system in the mobile device 200 waits for an acknowledgement ACK_2 packet to finish the three-way handshaking procedure.

However, when the unexpected finish FIN packet is received from the base station 100, the mobile device 200 constantly waits in the awake state and consumes battery power. Therefore, in this case, the mobile device 200 switches from the first state 0 to the third state 2 sequentially, and switches back to the first state 0, thereby terminating the TCP connection to prevent the waste of resources.

In other words, when it is confirmed that the TCP state of the mobile device 200 changes from the first state 0 to the third state 2 sequentially and changes back to the first state 0, and then the TCP connection is terminated, it is possible to solve the problems of battery consumption and resource allocation.

Figure 7:
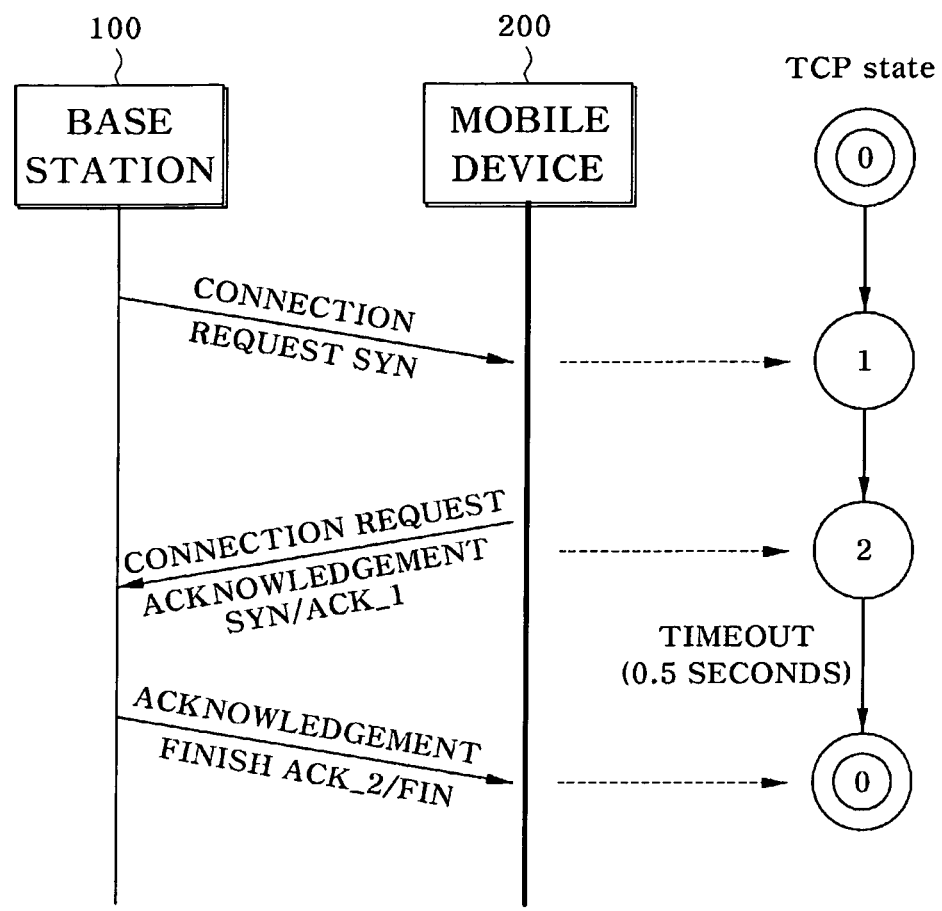
FIG. 7 illustrates the flow of packets and TCP state transition operations in a third example of an abnormal TCP connection.

FIG. 7 illustrates the flow of packets and TCP state transition operations in a third example of an abnormal TCP connection.

Referring to FIGS. 2 and 7, a case is illustrated in which a finish FIN packet is transmitted while completing three-way handshaking. First, when the mobile device 200 checks the reception of a connection request SYN packet transmitted from the base station 100, the TCP state of the mobile device 200 changes from the first state 0 to the second state 1. And then, when the mobile device 200 checks the transmission of a connection request acknowledgement SYN/ACK_1 packet to the base station 100, the TCP state of the mobile device 200 changes from the second state 1 to the third state 2.

Subsequently, the base station 100 may transmit to the mobile device 200 an acknowledgement finish ACK_2/FIN packet, in which an acknowledgement ACK_2 flag corresponding to the connection request acknowledgement SYN/ACK_1 packet and a FIN flag are set. When the mobile device 200 checks the reception of the acknowledgement finish ACK_2/FIN packet transmitted from the base station 100 according to the present invention, the TCP state of the mobile device 200 changes from the third state 2 directly to the first state 0, thereby safely terminating the TCP connection.

Meanwhile, when the base station 100 abnormally terminates the connection without transmitting any packet in the third state 2, a timeout is triggered according to the present invention, and the mobile device 200 also switches directly to the first state 0 in order to terminate the TCP connection.

In other words, when the mobile device 200 cannot receive any packet during a previously set timeout period, which may be about 0.5 seconds, the TCP state of the mobile device 200 changes from the third state 2 directly to the first state 0, thereby safely terminating the TCP connection.

Figure 8:
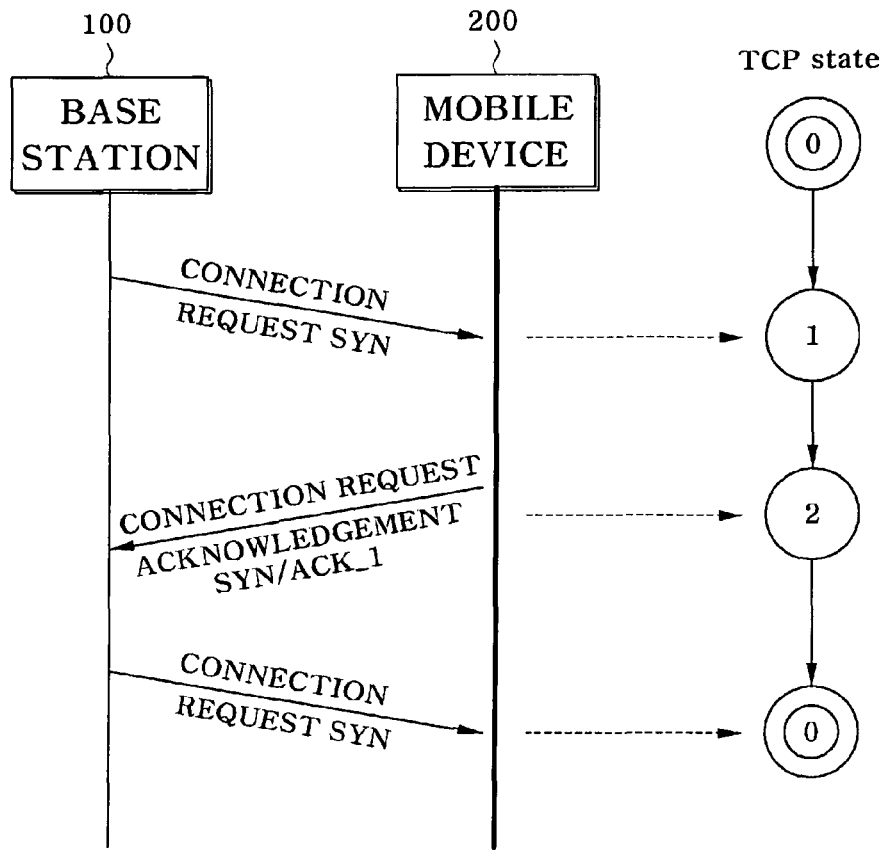
FIG. 8 illustrates the flow of packets and TCP state transition operations in a fourth example of an abnormal TCP connection.

FIG. 8 illustrates the flow of packets and TCP state transition operations in a fourth example of an abnormal TCP connection.

Referring to FIGS. 2 and 8, when the mobile device 200 checks the reception of a connection request SYN packet transmitted from the base station 100, the TCP state of the mobile device 200 changes from the first state 0 to the second state 1. And then, when the mobile device 200 checks the transmission of a connection request acknowledgement SYN/ACK__1 packet to the base station 100, the TCP state of the mobile device 200 changes from the second state 1 to the third state 2.

Here, the same base station 100 may continuously transmit the same connection request SYN packet to the mobile device 200 in the third state 2. When the mobile device 200 checks the reception of the connection request SYN packet from the same base station 100, the TCP state of the mobile device 200 changes from the third state 2 directly to the first state 0, thereby safely terminating the TCP connection.

After considering all the descriptions in the fourth example of an abnormal TCP connection, a case occurs in which the same connection request SYN packet is continuously transmitted during three-way handshaking. In this case, the connection request SYN packet is continuously transmitted to keep the mobile device 200 in the awake state. Here, according to the method of the present invention, the mobile device 200 switches from the first state 0 to the third state 2 sequentially, and then switches back to the first state 0 when receiving the same connection request SYN packet, thereby safely terminating the TCP connection. Thus, it is possible to efficiently prevent wireless resources and battery power of the mobile device 200 from being wasted.

Figure 9:
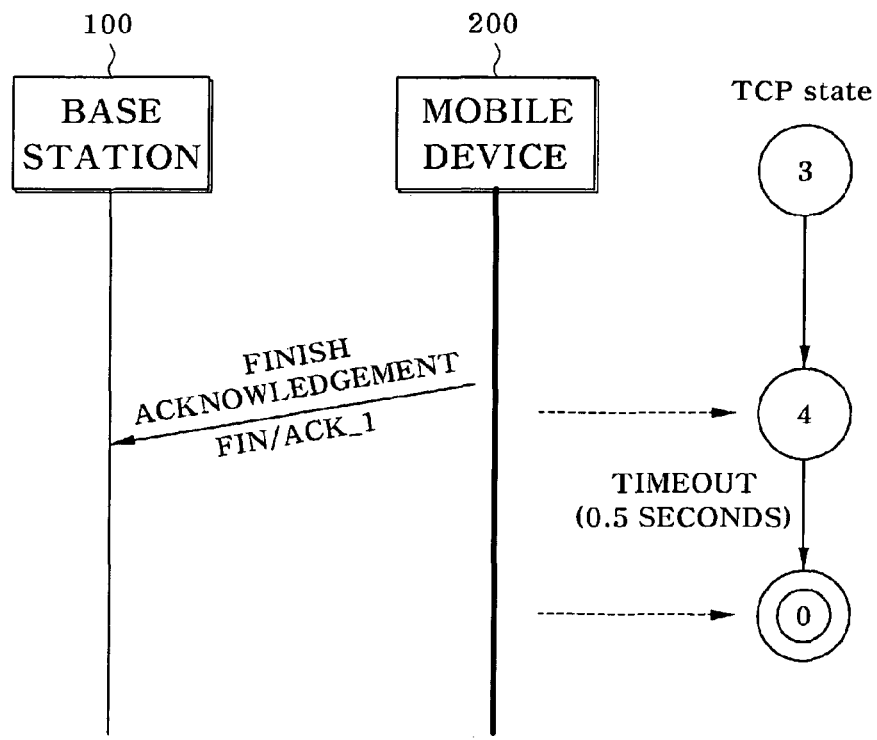
FIG. 9 illustrates the flow of packets and TCP state transition operations in a fifth example of an abnormal TCP connection.

FIG. 9 illustrates the flow of packets and TCP state transition operations in a fifth example of an abnormal TCP connection. In the fifth example, a timeout is triggered.

Referring to FIGS. 2 and 9, when the mobile device 200 wants to terminate a TCP connection after the TCP connection is established between the base station 100 and the mobile device 200, i.e., in the fourth state 3, the mobile device 200 switches from the fourth state 3 to the fifth state 4 and waits for an acknowledgement ACK__2 packet from the base station 100 after transmitting a finish acknowledgement FIN/ACK__1 packet to the base station 100. Here, when there is no reply during a previously set timeout period, which may be about 0.5 seconds, the TCP state of the mobile device 200 changes from the fifth state 4 directly to the first state 0, thereby safely terminating the TCP connection.

Meanwhile, the method of preventing a TCP-based DoS attack on a mobile device according to an exemplary embodiment of the present invention can be stored in a computer-readable recording medium using a computer code. The computer-readable recording medium may be any recordable device storing data that can be read by a computer system.

For example, the computer-readable recording medium may be a read-only memory (ROM), a random-access memory (RAM), a compact disk read-only memory (CD-ROM), a magnetic tape, a hard disk, a floppy disk, a mobile storage device, a nonvolatile memory (flash memory), an optical data storage device, and so on. Also, the recording medium may be carrier waves, e.g., transmission over the Internet.

In addition, the computer-readable recording medium may be distributed among computer systems connected via a communication network and stored in the form of a code that can be read and executed by a de-centralized method.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of preventing a Denial of Service (DoS) attack by checking flow of packets transmitted between a base station and a mobile station using a Transmission Control Protocol (TCP) protocol, the method comprising the steps of:

transmitting, at the mobile station, a connection request acknowledgement SYN/ACK__1 packet to the base station when the base station transmits a connection request SYN packet for a TCP connection to the mobile station, and the mobile station receives the transmitted connection request SYN packet;

transmitting, at the base station, an acknowledgement ACK__2 packet corresponding to the connection request acknowledgement SYN/ACK__1 packet to the mobile station when the transmitted connection request acknowledgement SYN/ACK__1 packet is received;

establishing the TCP connection when the mobile station receives the transmitted acknowledgement ACK__2 packet; and determining that the established TCP connection is abnormal and terminating the established TCP connection if the mobile station receives a packet, in which a reset RST or connection request SYN flag is set, transmitted from the base station, wherein when the TCP connection is established, and then the mobile station cannot receive any packet during a previously set timeout period, the base station is determined to have abnormally terminated the TCP connection, and the mobile station safely terminates the TCP connection.

2. The method according to claim 1, wherein the timeout period is set to 0.5 seconds.

3. A method of preventing a Denial of Service (DoS) attack by checking flow of packets transmitted between a base station and a mobile device using a Transmission Control Protocol (TCP) protocol, the method comprising the steps of transmitting, at the mobile device, a connection request acknowledgement SYN/ACK__1 packet to the base station when the base station transmits a connection request SYN packet for a TCP connection to the mobile device, and then the mobile device receives the transmitted connection request SYN packet;

receiving, at the base station, the transmitted connection request acknowledgement SYN/ACK__1 packet and then, in response to the SYN/ACK__1 packet, transmitting a finish FIN packet to the mobile device; and determining that the TCP connection is abnormal and terminating the TCP connection if the mobile device receives the transmitted finish FIN packet, wherein when the mobile device cannot receive any packet during a previously set timeout period after transmitting the connection request acknowledgement SYN/ACK__1 packet to the base station, the base station is determined to have abnormally terminated the TCP connection, and the mobile device safely terminates the TCP connection.

4. A method of preventing a Denial of Service (DoS) attack by checking flow of packets transmitted between a base station and a mobile device using a Transmission Control Protocol (TCP) protocol, the method comprising the steps of
transmitting, at the mobile device, a connection request acknowledgement SYN/ACK_1 packet to the base station when the base station transmits a connection request SYN packet for a TCP connection to the mobile device, and then the mobile device receives the transmitted connection request SYN packet;
receiving, at the base station, the transmitted connection request acknowledgement SYN/ACK_1 packet and then, in response to the SYN/ACK_1 packet, transmitting an acknowledgement finish ACK_2/FIN packet, in which an acknowledgement ACK_2 flag corresponding to the connection request acknowledgement SYN/ACK_1 packet and a FIN flag are set, to the mobile device; and
determining that the TCP connection is abnormal and terminating the TCP connection if the mobile device receives the transmitted acknowledgement finish ACK_2/FIN packet, wherein when the mobile device cannot receive any packet during a previously set timeout period after transmitting the connection request acknowledgement SYN/ACK_1 packet to the base station, the base station is determined to have abnormally terminated the TCP connection, and the mobile device safely terminates the TCP connection.

5. A method of preventing a Denial of Service (DoS) attack by checking flow of packets transmitted between a base station and a mobile device using a Transmission Control Protocol (TCP) protocol, the method comprising the steps of:
transmitting, at the mobile device, a connection request acknowledgement SYN/ACK_1 packet to the base station when the base station transmits a connection request SYN packet for a TCP connection to the mobile device, and then the mobile device receives the transmitted connection request SYN packet;
receiving, at the base station, the transmitted connection request acknowledgement SYN/ACK_1 packet and then, in response to the SYN/ACK_1 packet, retransmitting the connection request SYN packet to the mobile device; and
determining that the TCP connection is abnormal and terminating the TCP connection if the mobile device receives the retransmitted connection request SYN packet, wherein when the mobile device cannot receive any packet during a previously set timeout period after transmitting the connection request acknowledgement SYN/ACK_1 packet to the base station, the base station is determined to have abnormally terminated the TCP connection, and the mobile device safely terminates the TCP connection.

6. The method according to claim 5, wherein the timeout period is set to 0.5 seconds.

7. A non-transitory computer-readable recording medium storing a computer program capable of executing the method according to claim 1.

8. A non-transitory computer-readable recording medium storing a computer program capable of executing the method according to claim 3.

9. A non-transitory computer-readable recording medium storing a computer program capable of executing the method according to claim 4.

10. A non-transitory computer-readable recording medium storing a computer program capable of executing the method according to claim 5.

11. The method according to claim 3, wherein the timeout period is set to 0.5 seconds.

12. The method according to claim 4, wherein the timeout period is set to 0.5 seconds.

* * * * *